United States Patent
Shinotsuka et al.

(10) Patent No.: US 7,464,390 B2
(45) Date of Patent: Dec. 9, 2008

(54) OPTICAL INFORMATION RECORDING MEDIUM, AND RECORDING AND REPRODUCING APPARATUS OF THE SAME

(75) Inventors: Michiaki Shinotsuka, Hiratsuka (JP); Hiroyuki Iwasa, Yokohama (JP); Masaru Shinkai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 444 days.

(21) Appl. No.: 11/347,234

(22) Filed: Feb. 6, 2006

(65) Prior Publication Data
US 2006/0171290 A1 Aug. 3, 2006

Related U.S. Application Data

(63) Continuation of application No. PCT/JP2004/011146, filed on Aug. 4, 2004.

(30) Foreign Application Priority Data

Aug. 7, 2003 (JP) ............................. 2003-289434
Mar. 11, 2004 (JP) ............................. 2004-069614

(51) Int. Cl.
*G11B 7/24* (2006.01)
(52) U.S. Cl. .................. 720/718; 369/275.1; 369/275.3
(58) Field of Classification Search ................. 720/718; 369/275.1, 275.3
See application file for complete search history.

(56) References Cited

U.S. PATENT DOCUMENTS

| 4,450,553 | A | 5/1984 | Holster et al. |
| 5,202,875 | A | 4/1993 | Rosen et al. |
| 6,069,868 | A * | 5/2000 | Kashiwagi ................ 369/275.1 |
| 6,175,548 | B1 * | 1/2001 | Kashiwagi ................ 369/275.1 |
| 6,611,491 | B2 * | 8/2003 | Nishiuchi et al. ......... 369/275.1 |
| 2002/0060978 | A1 * | 5/2002 | Hirotsune et al. ........ 369/275.3 |
| 2002/0150032 | A1 * | 10/2002 | Nishiuchi et al. ......... 369/275.3 |

FOREIGN PATENT DOCUMENTS

| JP | 03-157830 | 7/1991 |
| JP | 10-505188 | 5/1998 |
| JP | 2001-010709 | 1/2001 |
| JP | 2001-084643 | 3/2001 |
| WO | WO-00/16320 | 3/2000 |
| WO | WO-00/23990 | 4/2000 |

* cited by examiner

*Primary Examiner*—Tianjie Chen
(74) *Attorney, Agent, or Firm*—Dickstein Shapiro LLP

(57) ABSTRACT

The present invention is to provide a practically usable, recordable or rewritable optical information recording medium having a pair of recording layers and a recording and reproducing apparatus for the medium.

The recording medium has a pair of recording layer structures on a substrate so as to sandwich a resin intermediate layer, and a recording beam and a reproducing beam are irradiated to two recording layer structures. The pair of recording layer structures respectively have a different track pitch, and the ratio of difference in the track pitch defined by Expression 1 is +0.03 to +0.15, $$(T2-T1)/T1 \qquad \text{Expression 1}$$

T1 represents a track pitch of the recording layer structure disposed on the laser beam irradiation side, and T2 represents a track pitch of the recording layer structure disposed on the inner side.

16 Claims, 2 Drawing Sheets

OPTICAL INFORMATION RECORDING MEDIUM, AND RECORDING AND REPRODUCING APPARATUS OF THE SAME

CROSS-REFERENCE TO RELATED APPLICATIONS

This is a continuation of Application No. PCT/JP2004/011146, filed on Aug. 4, 2004.

BACKGROUND OF THE INVENTION

1. Field of the Invention

The present invention relates to an optical information recording medium such as optical discs, more specifically, relates to an optical information recording medium having two recording layers, and a recording and reproducing apparatus for the optical information recording medium.

2. Description of the Related Art

Compact discs (CD) have become widely used and have established an important position. In addition, not only reproduce-only optical discs but also CD-R/RW (CD Recordable/Rewritable), and DVD±R/RW (Digital Versatile Disc±Recordable/Rewritable) have remarkably become popular as write once read many (WORM) optical discs and rewritable optical discs which enable recording information. Recently, there has been a blossoming of studies and developments for higher-density optical discs.

In the case of CD-R (Read Only Compact Disc-Recordable) and DVD±R (Read Only Digital Versatile Disc±Recordable), information is recorded and reproduced by reflectance variations induced by deformation of dyes. In the case of rewritable optical discs, recording information signals are detected by utilizing reflectance difference and changes of phase difference induced by refractive index difference between amorphous condition and crystalline condition.

To increase storage capacity of one optical disc, a system having a plurality of data layers has been proposed. An optical disc having two or more data layers enables gaining access to various layers by changing the focal point of lens.

For example, U.S. Pat. No. 5,202,875 discloses an optical disc drive system having a plurality of data layers, and the optical disc used for the system comprises a plurality of substrates provided with data layers each of which is disposed at intervals with air-gap or a plurality of data layers in solid structures.

In U.S. Pat. No. 4,450,553, the recording medium employs a plurality of data layers in solid structures, and each of these data layers is a CD type data layer.

Each of the optical recording media disclosed in International Publication Nos. WO00/016320, and WO00/023990 has a recording layer which comprises only a dye layer or a phase-change layer, and the recording medium does not employ a laminar structure allowing for compatibility with reflectance, DVD, and the like. A first aspect of the invention described that it is preferred that the information layer preferably comprise at least two or more layers, however, the invention does not actually allow for a two-layered recording layer.

Japanese Patent Application Laid-Open (JP-A) Nos. 2001-084643 and 2001-10709 disclose a recording medium having two recording layers which comprise organic materials, however, the recording medium is not at the practical use level.

As described above, there are various proposals for optical recording media, however, practically, most of the recording media have not been put into practical use and/or do not allow for compatibility within reflectance, and the like.

Japanese Patent Application Laid-Open (JP-A) No. 03-157830 describes that the recording thin layer comprises two or more layers, and the material of the thin layer changes its optical constant by irradiating a laser beam to the recording thin layer, and the detectable change of the optical constant is induced primarily by phase change of a reflected beam or a transmitted beam of the incident beam. However, the invention does not allow for compatibility with ROM (Read Only Memory), and the invention has a laminar structure different from that of the present invention as described in the invention as follows: An optical information recording medium comprises a first transparent layer, a first recording thin layer, a second transparent layer, a second recording thin layer, a third transparent layer, and a reflective layer, each of which has a refractive index different that of a base material, are sequentially disposed on the base material, and the layer thicknesses for the first transparent layer, the first recording thin layer, the second transparent layer, the second recording thin layer, the third transparent layer, and the reflective layer are selected such that the phase of the transmitted beam or the reflected beam of the incident beam can be changed when a recording material is changed.

For a two-layered reproduce-only recording medium, DVD-ROM has been put into practical use, however, a recordable or rewritable two-layered recording medium has not yet been put into practical use.

Japanese Patent Application Laid-Open (JP-A) No. 10-505188 discloses a recording medium having two information layers, and in claim 16 of the invention, it is described that the sample pit of the second substrate or the track pitch of guide grooves is made smaller than those of the first substrate. With respect to the effect of the recording medium, it is described that excellent signal reproducing can be performed to an information layer having a focal depth which is out of the focal depth of optical systems.

However, in the case of the recording medium, two substrates each having a different eccentricity are bonded each other, therefore, the rotation centers of the respective layers are misaligned each other by the bonding, and thus the eccentric condition of the front side substrate viewed from the laser beam irradiation side is reproduced by the record of a drive or a clamp of the recording and reproducing apparatus, and further, the eccentricity of the inner side substrate viewed from the laser beam irradiation side is added to the eccentricity of the substrate on the laser beam irradiation side by the misalignment of the rotation center when these substrates are bonded. Consequently, the eccentricity of the inner side substrate viewed from the information reproducing apparatus such as a drive or the like, in the worst case, has a loading eccentricity of the eccentricity of the front side substrate viewed from the laser beam irradiation side plus the eccentricity of the inner side substrate viewed from the laser beam irradiation side, which leads to failures in tracking, and makes reproducing, and recording/reproducing impossible.

SUMMARY OF THE INVENTION

It is therefore an object of the present invention to provide a practically usable, recordable or rewritable optical information recording medium having a pair of recording layers as well as to provide a recording and reproducing apparatus for the optical information recording medium.

The problems stated above can be solved by the following inventions 1) to 16), which are hereinafter referred to as the present inventions 1 to 16.

1) An optical information recording medium which comprises a substrate, a resin intermediate layer, and a pair of recording layer structures formed on the substrate so as to sandwich the resin intermediate layer, wherein the pair of recording layer structures is formed on the substrate so as to sandwich the resin intermediate layer, the optical information recording medium is recordable or rewritable optical information recording medium and is a two-layered optical information recording medium to which a recording beam and a reproducing beam are irradiated to the pair of recording layer structures from one direction, and the pair of recording layer structures individually has a different track pitch, and the ratio of difference in the track pitch between the pair of recording layer structures defined by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

2) The optical information recording medium according to the item 1), wherein each reflectance of the respective recording layers of the pair of recording layer structures at the time of recording and reproducing is 2% or more different from the reflectance of the substrate surface formed on the laser beam irradiation side.

3) The optical information recording medium according to the item 1), wherein the ratio of reflectance difference between the two recording layers defined by the following Expression 2 is within the range of ±0.15:

$$(R1-R2)/[(R1+R2)/2] \qquad \text{Expression 2}$$

where R1 represents a reflectance of the recording layer disposed on the laser beam irradiation side, and R2 represents a reflectance of the recording layer disposed on the inner side viewed from the laser beam irradiation side.

4) The optical information recording medium according to the item 1), wherein each of the two recording layers has a ratio of reflectance variations defined by the following Expression 3 is within the range of ±0.15 on the surface of each of the recording layers:

(Reflectance of recording layer−Average reflectance value of two recording layers)/Average reflectance value of two recording layers   Expression 3

5) The optical information recording medium according to the item 1), wherein the optical information recording medium has two substrates, and the reflectance of the surface of the opposite substrate with respect to the substrate to which the laser beam is irradiated is less than 4%.

6) The optical information recording medium according to the item 1), wherein the ratio of difference in recording linear density of the two-layered recording layer structures defined by the following Expression 4 is within the range of ±0.1:

$$(S1-S2)/S1 \qquad \text{Expression 4}$$

where S1 represents a linear density of the recording layer structure disposed on the laser beam irradiation side, and S2 represents a linear density of the recording layer structure disposed on the inner side viewed from the laser beam irradiation side.

7) The optical information recording medium according to the item 1), wherein at least any one of the pair of recording layer structures comprises a ROM area in which information cannot be recorded and rewritten.

8) The optical information recording medium according to the item 7), wherein both of the pair of two-layered recording layer structures respectively comprise a ROM area, and the ROM areas are set in the two-layered recording layer structures such that the edges of the two ROM areas are not overlapped each other.

9) The optical information recording medium according to the item 1), wherein the ratio of thickness variations of the resin intermediate layer defined by the following Expression 5 is within the range of ±0.1 in the circumference of the recording medium:

(Maximum thickness of the resin intermediate layer−Minimum thickness of the resin intermediate layer)/Average thickness of the intermediate layer   Expression 5

10) A recording and reproducing apparatus comprises an apparatus irradiating a recording beam and a reproducing beam to a two-layered recordable or rewritable optical information recording medium, wherein the recording beam and the reproducing beam are irradiated to a pair of recording layer structures of the two-layered recordable or rewritable optical information recording medium from one direction, the recording and reproducing apparatus has a function to amplify a detected signal sum three times or more to thereby determine a threshold for drawing a focus when the reflectances of the two recording layers are respectively in the range of 5% to less than 12%, the two-layered recordable or rewritable optical information recording medium comprises a substrate, a resin intermediate layer, a pair of recording layer structures formed on the substrate so as to sandwich the resin intermediate layer, the pair of recording layer structures individually has a different track pitch, and the ratio of difference in the track pitch between the pair of recording layer structures represented by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

11) A recording and reproducing apparatus comprises an apparatus irradiating a recording beam and a reproducing beam to a two-layered recordable or rewritable optical information recording medium, wherein the recording beam and the reproducing beam are irradiated to a pair of recording layer structures of the two-layered recordable or rewritable optical information recording medium from one direction, the recording and reproducing apparatus has a function to amplify a detected signal sum two times or more to thereby determine a threshold for drawing a focus when the reflectances of the two recording layers are respectively in the range of 12% to less than 24%, the two-layered recordable or rewritable optical information recording medium comprises a substrate, a resin intermediate layer, a pair of recording layer structures formed on the substrate so as to sandwich the resin intermediate layer, the pair of recording layer structures individually has a different track pitch, and the ratio of difference in the track pitch between the pair of recording layer structures represented by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

12) A recording and reproducing apparatus comprises an apparatus irradiating a recording beam and a reproducing beam to a two-layered recordable or rewritable optical information recording medium, wherein the recording beam and the reproducing beam are irradiated to a pair of recording layer structures of the two-layered recordable or rewritable optical information recording medium from one direction, the recording and reproducing apparatus has a function to discriminate the type of recording medium from recordable recording media, rewritable recording media, and reproduce-only recording media by the reflectances of the recording medium when the recording medium is reproduced using two different wavelengths, the two-layered recordable or rewritable optical information recording medium comprises a substrate, a resin intermediate layer, a pair of recording layer structures formed on the substrate so as to sandwich the resin intermediate layer, the pair of recording layer structures individually has a different track pitch, and the ratio of difference in the track pitch between the pair of recording layer structures represented by the following Expression 1 is +0.03 to +0.15:

$(T2-T1)/T1$          Expression 1 where T1 represents a track pitch of the recording layer structure disposed on the laser beam irradiation side, and T2 represents a track pitch of the recording layer structure disposed on the inner side viewed from the laser beam irradiation side.

13) A method for recording and reproducing an optical recording medium comprises irradiating a recording beam to a two-layered recordable or rewritable optical information recording medium which comprises a substrate, a resin intermediate layer, and a pair of recording layer structures formed on the substrate so as to sandwich the resin intermediate layer, and irradiating a reproducing beam to the two-layered recordable or rewritable optical information recording medium from one direction, wherein each of the pair of recording layer structures of the optical information recording medium individually has a different track pitch, the ratio of difference in the track pitch between the pair of recording layer structures defined by the following Expression 1 is +0.03 to +0.15:

$(T2-T1)/T1$          Expression 1 where T1 represents a track pitch of the recording layer structure disposed on the laser beam irradiation side, and T2 represents a track pitch of the recording layer structure disposed on the inner side viewed from the laser beam irradiation side.

14) The method for recording and reproducing an optical recording medium according to the item 13) further comprises determining a threshold for drawing a focus by amplifying a detected signal sum three times or more, when each reflectance of the two recording layers is within the range of 5% to less than 12%.

15) The method for recording and reproducing an optical recording medium according to the item 13) further comprises determining a threshold for drawing a focus by amplifying a detected signal sum two times or more, when each reflectance of the two recording layers is within the range of 12% to less than 24%.

16) The method for recording and reproducing an optical recording medium according to the item 13) further comprises discriminating the type of recording medium from recordable recording media, rewritable recording media, and reproduce-only recording media by the reflectances of the recording medium when the recording medium is reproduced using two different wavelengths.

DESCRIPTION OF THE PREFERRED EMBODIMENTS

Hereinafter, the present invention will be described in detail.

Figure 1:
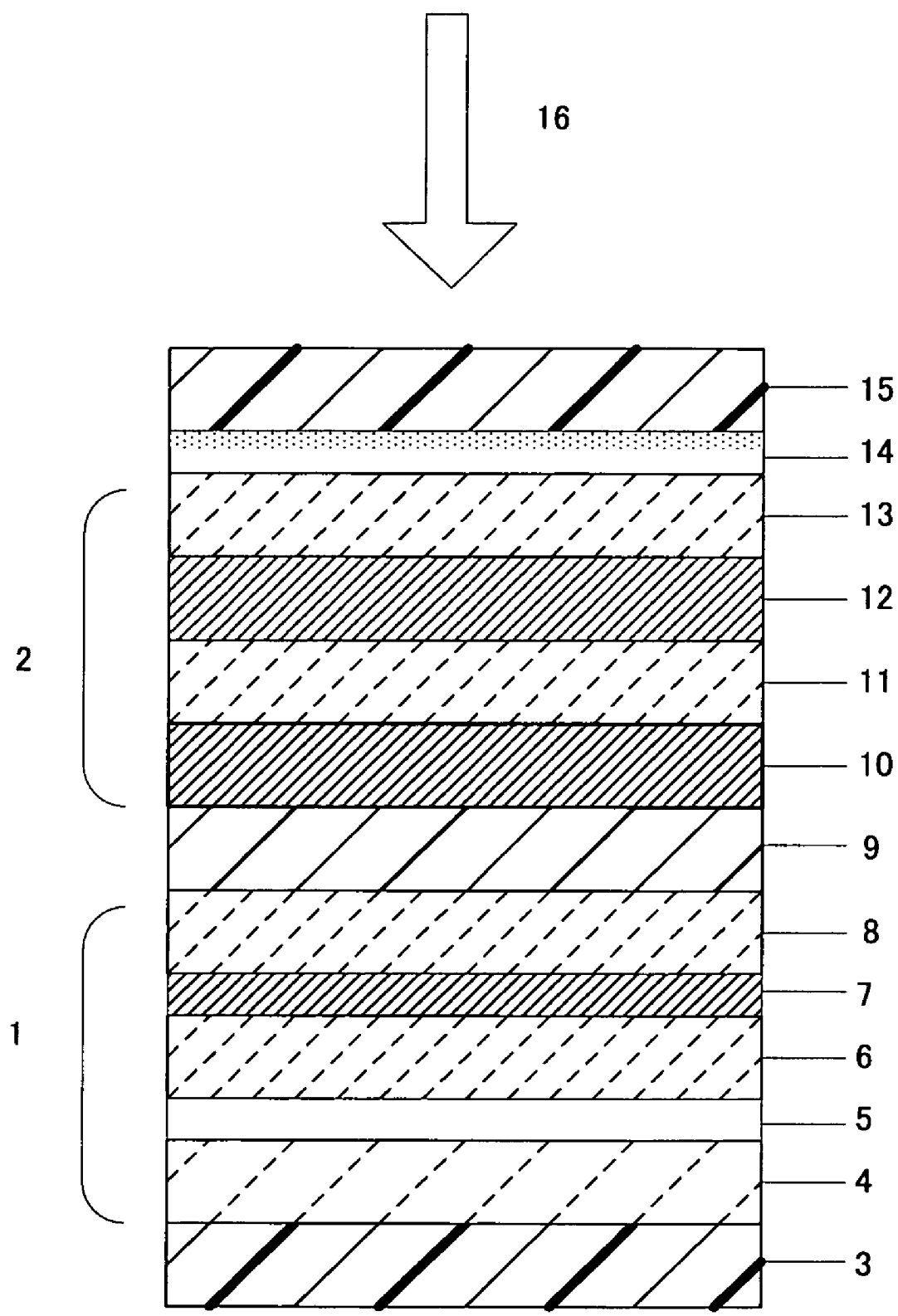
FIG. 1 is a schematic view exemplarily showing an example of a laminar structure of the optical information recording medium of the present invention, in which a phase-change recording material is used.
Figure 2:
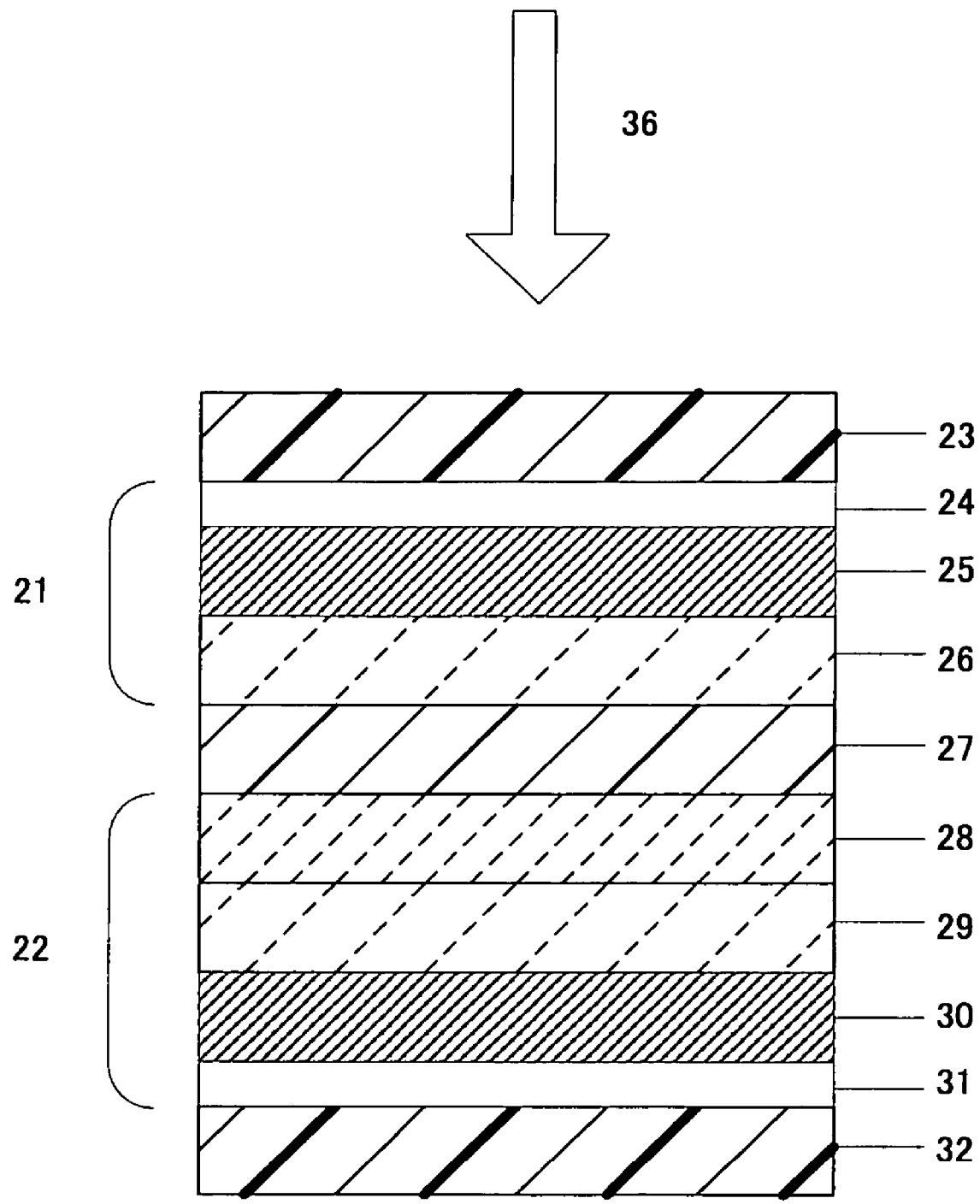
FIG. 2 is a schematic view exemplarily showing an example of another laminar structure of the optical information recording medium of the present invention, in which a dye material is used.

FIGS. 1 and 2 respectively show a laminar structure of the optical information recording medium of the present invention. FIG. 1 exemplarily shows a laminar structure using a material capable of changing optical properties between amorphia and crystallinity, so-called phase-change recording material. FIG. 2 exemplarily shows a laminar structure using a dye material as a material for the recording layer. Recording of information in each of the recording layers is performed by recording of a pattern called "mark". In the case of an optical recording medium shown in FIG. 1, first recording layer structure 1 is formed on substrate 3 having guide grooves thereon, separately, second recording layer structure 2 is formed on cover substrate 15 having guide grooves thereon through adhesive layer 14, and the first recording layer structure and the second recording layer structure are bonded through resin intermediate layer 9 in a laminar structure to thereby form an optical information recording medium. The first recording layer structure has a laminar structure in which recording layer 7 is sandwiched in between first protective layer 6 and second protective layer 8, and reflective heat dissipation layer 4 is arranged for easy heat dissipation. The second recording layer structure 2 has a laminar structure in which second recording layer 12 is sandwiched in between fourth protective layer 11 and fifth protective layer 13, and Ag or Ag alloy layer 10 is further formed on the fourth protective layer 11. When the fourth protective layer 11 comprises sulfur S, an antisulfuration layer (not shown) may be preferably disposed between the Ag or Ag alloy layer 10 and the fourth protective layer 11. In FIG. 1, the arrow 16 represents the direction of beam irradiation. It should be noted that FIG. 1 shows a case where $Ag_5In_5Sb_{65}Te_{25}$ is used for the first recording layer 7, $Ge_5Ag_2Sb_{70}Te_{23}$ is used for the second recording layer 12, polycarbonate is used for the substrate 3 and the cover substrate 15, $Ag_{97}Cu_1Pt_1Pd_1$ is used for the reflective heat dissipation layer 4 and the Ag or Ag alloy layer 10, SiC is used for absorption layer 5, $ZnSSiO_2$ is used for the first protective layer 6, the second protective layer 8, the fourth protective layer 11, and the fifth protective layer 13, SD318 being an UV curable resin is used for the resin intermediate layer 9, and an acrylic double-sided adhesive is used for the resin intermediate layer 14, however, the laminar structure of the present invention is not limited to the above stated.

As shown in FIG. 2, when using a dye material for the recording layers, it also has the same basic laminar structure as in FIG. 1, in which substrate 23 with first recording layer structure 21 formed thereon and cover substrate 32 with second recording layer structure 22 formed thereon are formed in a laminar structure through resin intermediate layer 27, and the production method thereof is the same as the optical recording medium shown in FIG. 1. In FIG. 2, the arrow represents the laser beam incident direction. FIG. 2 shows the case where cyanine is used for first dye layer 24 and second dye layer 31, polycarbonate is used for the substrate 23 and the cover substrate 32, $Ag_{97}Cu_1Pt_1Pd_1$ is used for Ag or Ag alloy layers 25 and 30, IZO is used for first translucent layer 26 and second translucent layer 29, SD318 being an ultraviolet curable resin for resin intermediate layer 27, and $ZnSSiO_2$ is used for protective layer 28, however, the laminar structure of the optical recording medium of the present invention is not limited to the above stated.

In the present invention, the recording layer is configured such that the pair of recording layer structures respectively have a different track pitch, and the ratio of track pitch difference of the pair of recording layer structures, (T2−T1)/T1, is typically within the range of +0.03 to +0.15, preferably +0.05 to +0.15.

Ratio of track pitch difference=(T2−T1)/T1

In the expression, T1 represents a track pitch of the recording layer structure disposed on the laser beam irradiation side, and T2 represents a track pitch of the recording layer structure disposed on the inner side viewed from the laser beam irradiation side.

Since each track pitch of the recording layer structures individually corresponds to each track pitch of the substrates thereof, by making the track pitch of the inner side substrate viewed from the laser beam irradiation side wider than that of the front side substrate viewed from the laser beam irradiation side, the eccentricity of the inner side substrate is reduced, and tracking more rarely deviates from its usual position than the case where the inner side substrate and the front side substrate viewed from a reproducing and recording/reproducing apparatus such as a drive have the same track pitch, and this enables stable recording and reproducing.

Table 1 shows examined results of the relation between ratio of track pitch difference and tracking deviation with respect to an optical information recording medium having the laminar structure shown in FIG. 1. In Table 1, A represents a case where no tracking deviation occurred, and B represents, a case where a tracking deviation occurred. The tracking deviation was measured using a commercially available 4-split photodetector (PD).

Table 1 shows that when the ratio of track pitch difference is more than 0.15, tracking is unstable. This tendency also applies to an optical information recording medium having the laminar structure shown in FIG. 2.

TABLE 1

| Ratio of Track Pitch Difference | Tracking |
| --- | --- |
| 0.01 | B |
| 0.02 | B |
| 0.03 | A |
| 0.04 | A |
| 0.05 | A |
| 0.06 | A |
| 0.07 | A |
| 0.08 | A |
| 0.09 | A |
| 0.10 | A |
| 0.11 | A |
| 0.12 | A |
| 0.13 | A |
| 0.14 | A |

TABLE 1-continued

| Ratio of Track Pitch Difference | Tracking |
| --- | --- |
| 0.15 | A |
| 0.16 | B |
| 0.17 | B |
| 0.18 | B |

In addition, Table 2 shows, with respect to the optical information recording medium having the laminar structure shown in FIG. 1, examined results of the impact that the difference in reflectance (%) between each of the two recording layers and the substrate surface on the laser beam irradiation side had on focusing. In Table 2, A represents a case where a laser beam focus was drawn with no difficulty, and B represents a case where there was a difficulty in drawing a laser beam focus. It is noted that a typically used polycarbonate substrate has a surface reflectance around 4%.

The focusing was measured using a commercially available 4-split photodetector (PD). The amplitude of focused signals (peak-to-peak) obtained by the photodetector were measured, and the amplitude result was used to measure individual reflectances of each medium on a reflectance basis of a medium that the absolute reflectance was known, namely, the reflectance of Ge layer of a glass substrate, which has a reflectance of 30%.

Table 2 shows that when the reflectance difference is 2% or more, the recording layers can be discriminated from the substrate, and it is possible to separate the recording layers as a layer into which a laser beam focus can be drawn. However, since there are limitations on functions of measurement apparatuses, the reflectance preferably does not differ 20% or more in view of detection error.

This tendency also applies to optical information recording media having the laminar structure shown in FIG. 2.

TABLE 2

| Reflectance Difference (%) | Laser Beam Focus |
| --- | --- |
| 1 | B |
| 2 | A |
| 3 | A |
| 4 | A |
| 5 | A |

It is preferred that the ratio of reflectance difference between the two recording layers, (R1−R2)/[(R1+R2)/2] be within the range of ±0.15.

Ratio of reflectance difference between the two recording layers=(R1−R2)/[(R1+R2)/2]

In the expression, R1 represents a reflectance of the recording layer disposed on the laser beam irradiation side, and R2 represents a reflectance of the recording layer disposed on the inner side viewed from the laser beam irradiation side. When the reflectance difference is within the range, for example, when the average reflectance of the two recording layers is 7%, the lower reflectance is calculated as 5.95% =7%×(1−0.15), and the reflectance difference with the substrate (a polycarbonate substrate having a reflectance around 4%) is approx. 2%. Thus, as described above, the reflectance difference does not have an impact on focusing. The higher reflectance is calculated as 8.05%=7%×(1+0.15), and the reflectance is around 1% higher than the average reflectance, and thus the recording layer having the higher reflectance needs less variations in threshold of drawing a focus servo.

When the ratio of reflectance difference between the two recording layers is more than ±0.15, for example, when the reflectance of a first recording layer is 2%, and the reflectance of a second recording layer is 18%, a focus enters into the second recording layer, however, a focus does not enter into the first recording layer.

The reflectance of each of the two recording layers at the time of recording and/or reproducing the pair of two-layered recording layer structures being 2% or more different from the reflectance of the substrate surface on the laser beam irradiation side is contingent upon drawing a focus into the recording layers.

In addition, when the reflectance for drawing a focus is 4.5% to 5.5% or 5%±0.5%, it is difficult to accurately draw a focus due to the narrow range of reflectance. Thus, when a recording medium having a low reflectance around 5% is used, it is preferred that the reflectance be amplified three times or more to gain a reflectance range for drawing a focus of 5%±1.5% or more so as to draw a focus. Further, as a recording and reproducing apparatus, when a two-layered recording medium in which the reflectances of the two recording layers are within the range of 5% to 12%, is used, it is desirable to set the recording and reproducing apparatus such that the signal sum detected by a photodetector (PD) is amplified three times or more to determine the threshold for drawing a focus.

When the recording layers have a reflectance of 5% being the minimum reflectance value, the reflectance difference between the substrate and the recording layers is approx. 1%, because the reflectance of the substrate is around 4%, which is a reflectance of a polycarbonate substrate typically used in optical discs. This causes a detection error. Then, by amplifying the reflectance or the signal sum detected by a photodetector (PD) three times or more, it is possible to increase the reflectance difference 3% or more to thereby make the reflectance or the signal sum easily detected. Amplifying the reflectance or the signal sum detected by a photodetector (PD) two times also enables to detect the reflectance or the signal sum, however, by amplifying it three times, the reflectance or the signal sum can be more easily detected.

With respect to a two-layered optical recording medium with the reflectances of the two recording layers within the range of 12% to less than 24%, for example, when the average reflectance of the two recording layers is 18%, and the ratio of reflectance difference between the two recording layers is ±0.15, the lower reflectance is calculated as 15.3%=18%×(1−0.15), and the higher reflectance is calculated as 20.7%=18%×(1+0.15). The reflectances of the two recording layers are deviated from the average value by around 3%, however, the threshold to which a focus entered can be taken with an ample margin because the reflectance difference between the recording layers and the substrate is large. However, as a recording and reproducing apparatus, to allow a further margin, it is desired to amplify the detected signal sum two times or more to determine the threshold for drawing a focus.

To steadily perform recording and reproducing, it is desired that the ratio of reflectance variations of the two recording layers be within the range of ±0.15 on the surface of each of the recording layers. The ratio of the reflectance variations is determined by the following expression:

Ratio of reflectance variations=(Reflectance of recording layer−Average reflectance value of two recording layers)/Average reflectance value of two recording layers Further, it is desired that the reflectance of the substrate surface disposed on the opposite side of the surface on the laser beam irradiation side be less than 4% by coating or the like such that the reflectance cannot be read from the opposite surface. Such a configuration disables a recording and reproducing apparatus to execute reading and needs less redundant focusing movements.

In addition, when the ratio of difference in recording linear density $(S1-S2)/S1$ of the pair of two recording layer structures is set within the range of ±0.1, it is preferable because there is no need to perform a circuit change in terms of signal processing, and it has little influence on a recording and reproducing apparatus. The ratio of difference in recording linear density is determined by the following expression:

Ratio of Difference in Recording Linear Density= $(S1-S2)/S1$

In the expression, S1 represents a linear density of the recording layer structure on the laser beam irradiation side, and S2 represents a linear density of the recording layer structure on the inner side viewed from the laser beam irradiation side. In other words, when the variations in recording linear density are within the above-noted range, data can be discriminated because the variations fall on a usual temporal variation range of data. It is noted that in the case of usual recording, even when there is around 10% time-lag in the worst case, no error occurs.

In the case of a two-layered recordable and/or rewritable optical information recording medium, a pit area where information cannot be recoded and rewritten (ROM area) may be allocated to the recording medium.

In the case of a two-layered recording medium, a large amount of information is stored, therefore, there are a wide variety of utilizing methods as a medium. Then, by setting a ROM area to record non-changeable information or information prevented to be changed (ROM information) in the ROM area, it is possible to enhance the utility value and utilization efficiency of the recording medium.

However, when a ROM area is allocated to any one of the two recording layers, recording and reproducing properties may degrade at the portion of the recording layer without having the ROM area which is positioned corresponding to the portion the ROM area being set, because a ROM area has a large amount of laser beam interference. For example, when a ROM area is set in a recording layer on the laser beam irradiation side, a large amount of light scattering occurs because the ROM area has deep pits, and there are problems with recording and rewriting of information to the portion of the recording layer disposed on the inner side which corresponds to the ROM area portion. When a recordable recording medium is set at the laser beam irradiation side, a ROM area is allocated at the inner side of the recording medium, and the recording medium comprises a recording layer accompanied by deformation from a dye, reproducing property (jitter) of the recording layer on the inner side degrades during the recordable medium being recorded.

Since a ROM area typically has a deep groove depth, and by allocating a ROM area to a recording layer, the reflectance of the recording layer drastically changes at the boundary between the ROM area and the recording area, namely, at the edge of the ROM area, the slice level at the time of binarization varies to easily cause errors. When each of the pair of two-layered recording layer structures has a ROM area, the number of errors is increased by signal interference or crosstalk between the two recording layers because there is a boundary between the ROM area and the recording area (area to record information in grooves, land, and the like). Thus, it is preferred to set the ROM areas in the two recording layers such that the individual boundaries between the ROM area and the recording area or the individual edges of the ROM areas are not overlapped each other to reduce the number of errors.

Typically, an intermediate layer of DVD-ROM has a thickness of 55 μm±15 μm, however, since the recording medium is for reproducing only and has a high reflectance, the ratio SIN (ratio of signal to noise) of the recording medium is high, and information can be reproduced even when the thickness of the intermediate layer somewhat changes, and there is an aberration difference caused by difference in thickness of the substrates, which seems near to focusing difference.

However, in the case of a recordable or rewritable recording medium, it has a low ratio SIN (ratio of signal to noise) because of the low reflectance, and the thickness variations induce RF (radio frequency) variations. Therefore, variations in high frequencies degrade the jitter property, which leads to increases in the number of errors, although variations in low frequencies can be ignored by signal conditioning. Particularly, in the case of high-speed recording, the degradation of jitter property appears prominently, and thus it is liable to easily cause errors.

Thus, it is preferred that the ratio of thickness variations of the resin intermediate layer be within the range of ±0.1 in the circumference of the recording medium, in other words, the ratio of thickness variations be within the range of 10% of the average thickness. The ratio of thickness variations is determined by the following expression:

Ratio of Thickness Variations=(Maximum thickness−Minimum thickness)/Average thickness With this configuration, it is possible to reduce the number of errors at any positions from the inner circumference across the outer circumference, because the recording medium needs less aberration variations, and recording marks can be clearly recorded.

Individual reflectances of a DVD+RW disc having a laminar structure shown in FIG. 1, a DVD+R disc having a laminar structure shown in FIG. 2, and a commercially available two-layered DVD-ROM disc were measured using a photodetector (PD) at wavelengths of 660 nm and 780 nm. Table 3 shows the measurement results.

The results shown in Table 3 exemplified that DVD+R disc had a conspicuous difference in reflectance depending on the difference in the two wavelengths, DVD+RW disc had a certain degree of difference in reflectance depending on the difference in the two wavelengths, and DVD-ROM disc had the same reflectance at the wavelengths. Namely, the difference in reflectance of discs when reproduced at two different wavelengths makes it possible to clearly discriminate which disc type of DVD+R, DVD+RW, or DVD-ROM is reproduced. Thus, it is possible to produce an information recording and reproducing apparatus capable of discriminating the type of recording medium to be reproduced by utilizing this property.

TABLE 3

|  | DVD Wavelength 660 nm | CD Wavelength 780 nm |
| --- | --- | --- |
| DVD + R Dye medium | 18 | 6 |
| DVD + RW Phase change medium | 8 | 5 |
| DVD-Rom Pit medium | 23 | 23 |

With respect to a recording medium having a low reflectance of 5% to less than 12%, like a two-layered phase change recording medium, to make the recording medium have a reflectance equal to a reflectance around 15% of a two-layered recordable recording medium having a dye recording layer, it is preferred to use a recording and reproducing apparatus having a function that focus deviations caused by jumping between two recording layers or the like can be prevented by means of a function by amplifying the level where a focus can be drawn to thereby enhance the ease of drawing a focus.

A recording and reproducing apparatus having a function capable of discriminating the type of recording media by utilizing the fact that the reflectances at two wavelengths, for example, a CD wavelength of 780 nm, and a DVD wavelength of 660 nm differ each other depending on the type of recording medium from a recordable medium, a rewritable medium, and a reproduce-only medium.

According to the present invention, it is possible to provide a practically usable, recordable or rewritable optical information recording medium having a pair of recording layer structures, and a recording and reproducing apparatus for the optical information recording medium.

EXAMPLES

Hereafter, the present invention will be described in detail referring to specific examples, however, the present invention is not limited to the disclosed examples.

Example 1

<In the Case of Phase-Change Recording Medium >

On a polycarbonate substrate having guide grooves with a track pitch of 0.80 μm and a thickness of 0.6 mm, as a first recording layer structure, a reflective heat dissipation layer made from Ag having a thickness of 120 nm, a first protective layer made from $ZnSSiO_2$ having a thickness of 70 nm, a first recording layer made from $Ag_5In_5Ge_5Sb_{67}Te_{18}$ having a thickness of 17 nm, and a second protective layer made from $ZnSSiO_2$ having a thickness of 17 nm were sequentially formed in this order by sputtering.

On the other hand, on a polycarbonate cover substrate having guide grooves with a track pitch of 0.74 μm and a thickness of 0.6 mm, as a second recording layer structure, a fifth protective layer made from $ZnSSiO_2$ having a thickness of 70 nm, a second recording layer made from $Ag_5In_5Ge_5Sb_{67}Te_{18}$ having a thickness of 7 nm, a fourth protective layer made from $ZnSSiO_2$ having a thickness of 18 nm, a $Zr_{50}O_5C_{45}$ layer as an antisulfuration layer having a thickness of 3 nm, an Ag layer having a thickness of 10 nm, and a translucent layer made from ITO being a mixture of $In_2O_3$ and SnO having a thickness of 100 nm were sequentially formed in this order by sputtering.

Next, the substrate and the cover substrate each on which the individual layers had been formed were bonded through a resin intermediate layer made from an UV curable resin having a thickness of 50 μm (SD318, manufactured by Dainippon Ink and Chemicals, Inc.) such that the recording layers were positioned inside thereof to thereby yield an optical information recording medium according to the present invention.

To the optical information recording medium, a laser beam was irradiated from the cover substrate side for evaluation of the optical information recording medium using an optical disc evaluation apparatus (DDU-1000, manufactured by PULSTEC INDUSTRIAL CO., LTD) at a LD wavelength of 660 nm with a lens aperture NA 0.65.

The optical information recording medium was recorded and reproduced under the conditions of reproducing power: 0.7 mW; bottom power: 0.7 mW; recording power: 18 mW (recording layer on the laser beam irradiation side), and 23 mW (recording layer on the inner side); and recording strategies with an emission waveform of leading pulse: 0.7 T, multi-pulse: 0.4 T, off pulse: 0.1 T (T: 15.9 ns). Both of the two recording layers were recorded and reproduced at a linear density of 0.267 µm/bit.

Consequently, with respect to the servo, a focus was preferably drawn to both the two recording layers, and the optical information recording medium had excellent tracking, recording and reproducing results. The optical information recording medium had excellent jitter property or recording and reproducing properties of 7.5%. The error correctable range is up to a jitter value of 15%. Each of the recording layers respectively had a reflectance of 7% and 8%.

Example 2

<In the case of Recordable Medium using a Dye >

On a polycarbonate substrate having guide grooves with a track pitch of 0.74 µm and a thickness of 0.6 mm, a first dye layer made from cyanine having a thickness of 100 nm was formed by spin-coating, and an IZO (InOx-ZnOx) layer having a thickness of 80 nm was formed as a first translucent layer on the first dye layer by sputtering.

On the other hand, on a polycarbonate cover substrate having guide grooves with a track pitch of 0.80 µm and a thickness of 0.6 mm, an $Ag_{97}In_1Cu_1Pd_1$ layer having a thickness of 150 nm was formed, a second dye layer made from cyanine having a thickness of 100 nm was formed on the $Ag_{97}In_1Cu_1Pd_1$ layer by spin-coating, and an IZO (InOx-ZnOx) layer having a thickness of 100 nm was formed as a second translucent layer on the second dye layer by sputtering.

Next, the substrate and the cover substrate each in which the individual layers had been formed were bonded through a resin intermediate layer made from an UV curable resin having a thickness of 38 µm (SD318, manufactured by Dainippon Ink and Chemicals, Inc.) such that the recording layers were positioned inside thereof to thereby yield an optical information recording medium according to the present invention.

To the optical information recording medium, a laser beam was irradiated from the cover substrate side, and the optical information recording medium was evaluated using an optical disc evaluation apparatus (DDU-1000, manufactured by PULSTEC INDUSTRIAL CO., LTD) at a LD wavelength of 660 nm with a lens aperture NA 0.65.

Consequently, with respect to the servo, a focus was preferably drawn to both the two recording layers, and the optical information recording medium had excellent tracking, recording and reproducing results. The optical information recording medium had excellent jitter property or recording and reproducing properties of 7.5%.

Each of the recording layers respectively had a reflectance of 19% and 18%.

Example 3

An optical information recording medium was produced in the same manner as in Example 1 except that the fifth protective layer made from $ZnSSiO_2$ formed on the cover substrate having guide grooves with a track pitch of 0.74 µm was changed so as to have a refractive index of 2.4 and a thickness of 60 nm, and the Ar flow rate used at the time of sputtering was changed from the conventional flow rate of 1 mTorr to 12 mTorr.

Consequently, the ratio of reflectance variations of the recording layer disposed on the cover substrate having guide grooves with a track pitch of 0.74 µm on the laser beam irradiation side, (Reflectance−Average reflectance value)/Average reflectance value was 0.19. A focus was drawn to the recording layer, however, the optical information recording layer showed unstable tracking performance and poor resulted in jitter property or recording and reproducing properties of 12.3%.

Example 4

An optical information recording medium was produced in the same manner as in Example 1 except that the opposite surface of the optical information recording medium with respect to the laser beam irradiation side was screen-printed with lacquer, namely, subjected to an ultraviolet curing, and the recording medium was inserted in a DVD reproducing apparatus such that the screen-printed surface faced to the laser beam irradiation in the DVD reproducing apparatus. Consequently, the DVD reproducing apparatus ejected the recording medium without beginning reproducing operation due to low reflectance of the optical information recording medium.

Example 5

The optical information recording medium produced in Example 1 was used, and the recording linear density of the recording, layer on the inner side having a track pitch of 0.81 µm was changed to 0.30 µm/bit for evaluation. The recording medium was then evaluated at a recording linear density of 0.267 µm/bit as a comparison. The misalignment of rotation center (eccentricity) of the recording layers was 30 µm.

The optical information recording medium was recorded and reproduced under the conditions of reproducing power: 0.7 mW; bottom power: 0.7 mW; recording power: 18 mW (recording layer on the laser beam irradiation side), and 23 mW (recording layer on the inner side); and recording strategies with an emission waveform of leading pulse: 0.7 T, multi-pulse: 0.4 T, off pulse: 0.1 T (T: 15.9 ns).

Consequently, when the recording medium was recorded at a recording linear density of 0.30 µm/bit, errors occurred at the time of reproducing, however, when the recording medium was recorded at a recording linear density of 0.267 µm/bit, it showed poor jitter property or recording and reproducing properties of 13.1%.

Example 6

In the optical information recording medium produced in Example 1, a pit portion (ROM area) was set in the range of 24 mm to 35 mm of the inner circumference of the recording layer on the inner side viewed from the laser beam irradiation side.

When the ROM area portion was reproduced at a reproducing power of 0.7 mW, it was possible to reproduce it without any errors.

For the portions other than the ROM area, excellent results were obtained as in Example 1.

Example 7

In the optical information recording medium produced in Example 6, a pit portion (ROM area) was also set in the range of 45 mm to 58 mm of a radius portion of the recording layer on the laser beam irradiation side.

When the ROM area portion was reproduced at a reproducing power of 0.7 mW, it was possible to reproduce it without any errors.

For the portions other than the ROM area, excellent results were obtained as in Example 1.

Reference Example 1

In the optical information recording medium produced in Example 6, a pit portion (ROM area) was also set in the range of 35 mm to 45 mm of a radius portion of the recording layer on the laser beam irradiation side.

When the ROM area portion was reproduced at a reproducing power of 0.7 mW, errors occurred at the radius portion of 35 mm in which the edge portions of the ROM areas of the two recording layers were overlapped each other.

Example 8

When producing the same laminar structure as in Example 1, to both recording layers to be bonded each other, two intermediate layers for each of the recording layers were prepared by spin-coating, aiming at the thickness of the intermediate layer of 25 μm being half of the intended thickness of 50 μm such that the thickness variations of the resin intermediate layers were within the range of ±0.1, and the resin intermediate layers were bonded each other. Since the thinner the thickness is, the easier the thickness uniformity is controlled, the thickness of the intermediate layer was in the range of 48 μm to 52 μm (thickness variations ±0.04).

To the optical recording medium, recording and reproducing were performed under the conditions of reproducing power: 0.7 mW, bottom power: 0.7 mW, recording power: 18 mW (the recording layer on the laser beam irradiation side), 23 mW (the recording layer on the inner side; and recording strategies with an emission waveform of leading pulse: 0.7 T, multi-pulse: 0.4 T, off pulse: 0.1 T (T: 15.9 ns). Both of the two recording layers were recorded and reproduced at a linear density of 0.267 μm/bit.

Consequently, the optical recording medium showed an excellent jitter value of 7% or less at the inner circumference across the outer circumference and had only a few errors.

Reference Example 2

As a case where the thickness variations of the resin intermediate layers being more than ±0.1, resin intermediate layers were bonded to each other in the same manner as in Example 8 except that the spin-coating condition was changed to increase the thickness variations of the resin intermediate layers. Consequently, the thicknesses of the resin intermediate layers were within the range of 421 μm to 581 μm (thickness variations ±0.16).

To the optical recording medium, recording and reproducing were performed in the same manner as in Example 8. As a result, the optical recording medium showed a poor jitter value of 12% to 14% at the inner circumference across the outer circumference.

Example 9

With respect to the optical information recording medium produced in Example 1, it was evaluated using an optical disc evaluation apparatus (DDU-1000, manufactured by PULSTEC INDUSTRIAL CO., LTD) at a LD wavelength of 660 nm with a lens aperture NA 0.65.

The relation between amplification factor and focus error of the recording medium was examined. Table 4 shows the results. In Table 4, C represents a case where focus errors occurs; B represents a case where errors occur in some cases; and A represents a case where no focus error occurs.

Table 4 shows that when the amplification factor was 3 times or more, no focus error occurred, and excellent tracking was enabled.

TABLE 4

| Amplification Factor | Focus Error |
| --- | --- |
| 1 | C |
| 2 | B |
| 3 | A |
| 4 | A |

Example 10

<In the Case of Recordable Medium using Inorganic Material>

On a polycarbonate substrate having guide grooves with a track pitch of 0.741 μm and a thickness of 0.6 mm, a first inorganic recording layer made from $Zr_{50}O_5C_{45}$ having a thickness of 15 nm, and a first translucent layer made from IZO (InOx, ZnOx) having a thickness of 80 nm were sequentially formed in this order by sputtering.

On the other hand, on a polycarbonate cover substrate having guide grooves with a track pitch of 0.80 μm and a thickness of 0.6 mm, a second inorganic recording layer made from $Zr_{50}O_5C_{45}$ having a thickness of 10 nm, and a second translucent layer made from IZO (InOx, ZnOx) having a thickness of 40 nm were sequentially formed in this order by sputtering.

Next, the substrate and the cover substrate each in which the individual layers had been formed were bonded through a resin intermediate layer made from an UV curable resin having a thickness of 55 μm (SD318, manufactured by Dainippon Ink and Chemicals, Inc.) such that the recording layers were positioned inside thereof to thereby yield an optical information recording medium according to the present invention.

To the optical information recording medium, a laser beam was irradiated from the substrate side, and the optical information recording medium was evaluated using an optical disc evaluation apparatus (DDU-1000, manufactured by PULSTEC INDUSTRIAL CO., LTD) at a LD wavelength of 660 nm with a lens aperture NA 0.65.

The relation between amplification factor and focus error of the recording medium was examined. Table 5 shows the results. In Table 5, B represents a case where errors occur in some cases; and A represents a case where no focus error occurs.

Table 5 shows that when the amplification factor was 2 times or more, no focus error occurred, and excellent tracking was enabled. Each recording layer had a reflectance of 12% and 14%, respectively.

TABLE 5

| Amplification Factor | Focus Error |
|---|---|
| 1 | B |
| 2 | A |
| 3 | A |

Example 11

Table 6 shows the measurement results of reflectances (%) of the first recording layers and the second recording layers of these various recording media.

To these recording media, reproducing was performed using an apparatus capable of reading a CD wavelength (780 nm) and a DVD wavelength (660 nm) as the drive. In Table 6, the two-layered DVD+R recording medium represents the recording medium produced in Example 2, the two-layered DVD+RW recording medium represents the recording medium produced in Example 1, and the other recording media respectively represents a commercially available recording medium.

As can be s4een from Table 6, it is possible to clearly discriminate which is a DVD+R disc, a DVD+RW disc, or a DVD+RW recording disc by difference in reflectance of the disc when reproducing it with the two different wavelengths.

Thus, it is possible to produce an information recording and reproducing apparatus capable of discriminating the type of a recording medium to be reproduced by utilizing this property. The difference between a single-layer CD-ROM disc and a single-layer DVD-ROM disc cannot be discriminated by only the reflectance when the disc is focused, however, when tracking is performed to see whether tracking is possible or impossible, the type of the disc can be discriminated. However, most of the commercially available DVD-ROM discs are two-layered recording media, therefore, the discrimination of the type is enabled by the reflectance when the disc is focused.

TABLE 6

| | | 780 nm | 660 nm | |
|---|---|---|---|---|
| DVD + R | Single-layer recording medium | 10 | 49 | had a reflectance of 45% or more only at a wavelength of 660 nm, and a reflectance less than 12% at a wavelength of 780 nm. |
| | Two-layered recording medium | 3 | 18 | had a reflectance of 12% to less than 24% at a wavelength of 660 nm, and a reflectance less than 5% at a wavelength of 780 nm. |
| DVD + RW | Single-layer recording medium | 10 | 20 | had a reflectance of 12% to less than 24% at a wavelength of 660 nm, and a reflectance of 5% to less than 12% at a wavelength of 780 nm. |
| | Two-layered recording medium | 3 | 7 | had a reflectance of 5% to less than 12% at a wavelength of 660 nm, and a reflectance less than 5% at a wavelength of 780 nm. |
| DVD + ROM | Single-layer recording medium | 50 | 52 | had a reflectance of 45% or more at both wavelengths of 660 nm and 780 nm. |
| | Two-layered recording medium | 23 | 25 | had a reflectance of 12% to less than 24% at both wavelengths of 660 nm and 780 nm. |
| CD-R | Single-layer recording medium | 51 | 10 | had a reflectance of 5% to less than 12% at a wavelength of 660 nm, and a reflectance of 45% or more at a wavelength of 780 nm. |
| CD-RW | Single-layer recording medium | 16 | 10 | had a reflectance less than 12% at a wavelength of 660 nm, and a reflectance of 12% to less than 24% at a wavelength of 780 nm. |
| CD-ROM | Single-layer recording medium | 50 | 51 | had a reflectance of 45% or more at both wavelengths of 660 nm and 780 nm. |

What is claimed is:

1. An optical information recording medium comprising:
   a substrate,
   a resin intermediate layer, and
   a pair of recording layer structures,
   wherein the pair of recording layer structures is formed on the substrate so as to sandwich the resin intermediate layer, the optical information recording medium is recordable or rewritable optical information recording medium and is a two-layered optical information recording medium to which a recording beam and a reproducing beam are irradiated to the pair of recording layer structures from one direction, and the pair of recording layer structures of the optical information recording medium individually has a different track pitch, the ratio of difference in the track pitch between the pair of recording layer structures defined by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

2. The optical information recording medium according to claim 1, wherein each reflectance of the respective recording layers of the pair of recording layer structures at the time of recording and reproducing is 2% or more different from the reflectance of the substrate surface formed on the laser beam irradiation side.

3. The optical information recording medium according to claim 1, wherein the ratio of reflectance difference between the two recording layers defined by the following Expression 2 is within the range of ±0.15:

$$(R1-R2)/[(R1+R2)/2] \qquad \text{Expression 2}$$

where R1 represents a reflectance of the recording layer disposed on the laser beam irradiation side, and R2 represents a reflectance of the recording layer disposed on the inner side viewed from the laser beam irradiation side.

4. The optical information recording medium according to claim 1, wherein each of the two recording layers has a ratio of reflectance variations defined by the following Expression 3 is within the range of ±0.15 on the surface of each of the recording layers:

$$\text{(Reflectance of recording layer–Average reflectance value of two recording layers)/Average reflectance value of two recording layers} \qquad \text{Expression 3.}$$

5. The optical information recording medium according to claim 1, wherein the optical information recording medium has two substrates, and the reflectance of the surface of the opposite substrate with respect to the substrate to which the laser beam is irradiated is less than 4%.

6. The optical information recording medium according to claim 1, wherein the ratio of difference in recording linear density of the two-layered recording layer structures defined by the following Expression 4 is within the range of ±0.1:

$$(S1-S2)/S1 \qquad \text{Expression 4}$$

where S1 represents a linear density of the recording layer structure disposed on the laser beam irradiation side, and S2 represents a linear density of the recording layer structure disposed on the inner side viewed from the laser beam irradiation side.

7. The optical information recording medium according to claim 1, wherein at least any one of the pair of recording layer structures comprises a ROM area in which information cannot be recorded and rewritten.

8. The optical information recording medium according to claim 7, wherein both of the pair of two-layered recording layer structures respectively comprise a ROM area, and the ROM areas are set in the two-layered recording layer structures such that the edges of the two ROM areas are not overlapped each other.

9. The optical information recording medium according to claim 1, wherein the ratio of thickness variations of the resin intermediate layer defined by the following Expression 5 is within the range of ±0.1 in the circumference of the recording medium:

$$\begin{array}{l}\text{(Maximum thickness of the resin intermediate layer–}\\ \text{Minimum thickness of the resin intermediate}\\ \text{layer)/Average thickness of the intermediate}\\ \text{layer} \qquad \text{Expression 5.}\end{array}$$

10. A recording and reproducing apparatus comprising:
an apparatus irradiating a recording beam and a reproducing beam to a two-layered recordable or rewritable optical information recording medium,
wherein the recording beam and the reproducing beam are irradiated to a pair of recording layer structures of the two-layered recordable or rewritable optical information recording medium from one direction, the recording and reproducing apparatus has a function to amplify a detected signal sum three times or more to thereby determine a threshold for drawing a focus when the reflectances of the two recording layers are respectively in the range of 5% to less than 12%, the two-layered recordable or rewritable optical information recording medium comprises a substrate, a resin intermediate layer, a pair of recording layer structures formed on the substrate so as to sandwich the resin intermediate layer, the pair of recording layer structures individually has a different track pitch, and the ratio of difference in the track pitch between the pair of recording layer structures represented by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

11. A recording and reproducing apparatus comprising:
an apparatus irradiating a recording beam and a reproducing beam to a two-layered recordable or rewritable optical information recording medium,
wherein the recording beam and the reproducing beam are irradiated to a pair of recording layer structures of the two-layered recordable or rewritable optical information recording medium from one direction, the recording and reproducing apparatus has a function to amplify a detected signal sum two times or more to thereby determine a threshold for drawing a focus when the reflectances of the two recording layers are respectively in the range of 12% to less than 24%, the two-layered recordable or rewritable optical information recording medium comprises a substrate, a resin intermediate layer, a pair of recording layer structures formed on the substrate so as to sandwich the resin intermediate layer, the pair of recording layer structures individually has a different track pitch, and the ratio of difference in the track pitch between the pair of recording layer structures represented by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

12. A recording and reproducing apparatus comprising:
an apparatus irradiating a recording beam and a reproducing beam to a two-layered recordable or rewritable optical information recording medium,
wherein the recording beam and the reproducing beam are irradiated to a pair of recording layer structures of the two-layered recordable or rewritable optical information recording medium from one direction, the recording and reproducing apparatus has a function to discriminate the type of recording medium from recordable recording media, rewritable recording media, and reproduce-only recording media by the reflectances of the recording medium when the recording medium is reproduced using two different wavelengths, the two-layered recordable or rewritable optical information recording medium comprises a substrate, a resin intermediate layer, a pair of recording layer structures formed on the substrate so as to sandwich the resin intermediate layer, the pair of recording layer structures individually has a different track pitch, and the ratio of difference in the track pitch between the pair of recording layer structures represented by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

13. A method for recording and reproducing an optical recording medium comprising:
irradiating a recording beam to a two-layered recordable or rewritable optical information recording medium which comprises a substrate, a resin intermediate layer, and a pair of recording layer structures formed on the substrate so as to sandwich the resin intermediate layer, and
irradiating a reproducing beam to the two-layered recordable or rewritable optical information recording medium from one direction,
wherein each of the pair of recording layer structures of the optical information recording medium individually has a different track pitch, the ratio of difference in the track pitch between the pair of recording layer structures defined by the following Expression 1 is +0.03 to +0.15:

$$(T2-T1)/T1 \qquad \text{Expression 1}$$

where T1 represents a track pitch of the recording layer structure disposed on the laser beam irradiation side, and T2 represents a track pitch of the recording layer structure disposed on the inner side viewed from the laser beam irradiation side.

14. The method for recording and reproducing an optical recording medium according to claim 13, further comprising determining a threshold for drawing a focus by amplifying a detected signal sum three times or more, when each reflectance of the two recording layers is within the range of 5% to less than 12%.

15. The method for recording and reproducing an optical recording medium according to claim 13, further comprising determining a threshold for drawing a focus by amplifying a detected signal sum two times or more, when each reflectance of the two recording layers is within the range of 12% to less than 24%.

16. The method for recording and reproducing an optical recording medium according to claim 13, further comprising discriminating the type of recording medium from recordable recording media, rewritable recording media, and reproduce-only recording media by the reflectances of the recording medium when the recording medium is reproduced using two different wavelengths.

\* \* \* \* \*